May 10, 1938.  T. B. TYLER  2,116,590
TRANSMISSION AUXILIARY
Original Filed May 14, 1932  2 Sheets-Sheet 2
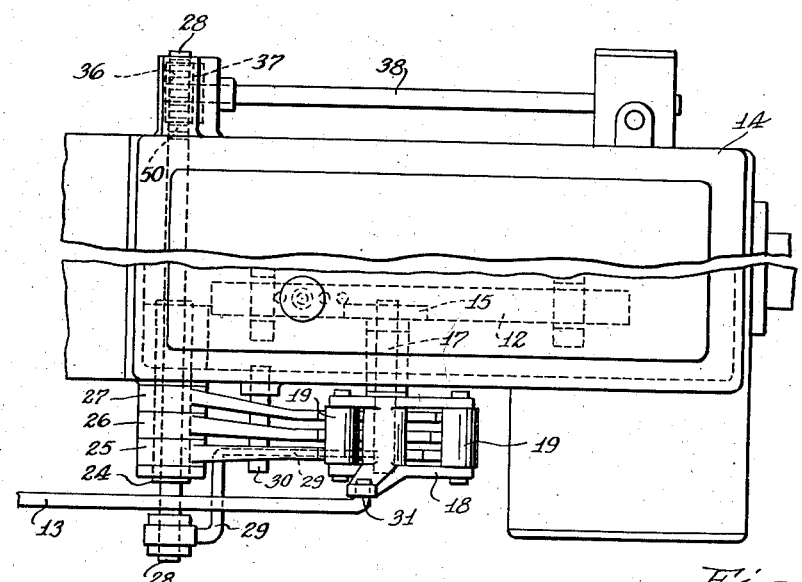
Fig. 2.
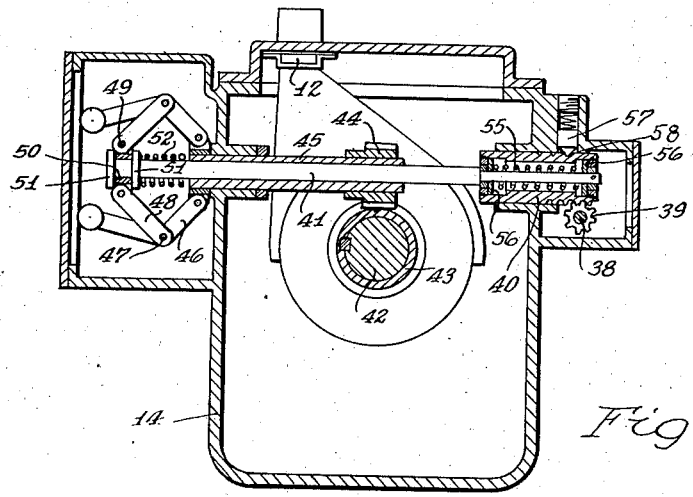
Fig. 3.
Inventor
Tracy Brooks Tyler
By
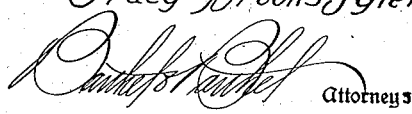
Attorneys Patented May 10, 1938

2,116,590

UNITED STATES PATENT OFFICE 2,116,590

TRANSMISSION AUXILIARY

Tracy Brooks Tyler, Chicago, Ill., assignor to The Monopower Corporation, Detroit, Mich., a corporation of Michigan Refile for abandoned application Serial No. 611,385, May 14, 1932. This application March 20, 1936, Serial No. 69,991

7 Claims. (Cl. 74—334)

The present application is a substitute for application Serial No. 611,385, filed May 14, 1932, which application was forfeited November 25, 1934 for failure to pay the final fee.

This invention relates to automatic selecting and shifting means for the transmission of automobiles and more particularly relates to means such as are shown in my copending application Serial No. 614,945, filed June 2, 1932, issued August 18, 1936, Patent No. 2,051,113.

The principal object of this invention is to provide novel means for operatively connecting the personally operable controlling or clutch actuating part of the mechanism to the selector arm or shifter member.

In Patent No. 2,051,113 the clutch pedal is shown as operatively connected to the selector arm or shifter member by a mechanical linkage. In this application, the clutch pedal is shown as connected to the selector arm through links and a fluid pressure device.

Other objects of the present invention will become apparent upon reference to the following detailed description and to the appended drawings in which Figure 1 shows an embodiment of the invention.

Fig. 2 shows certain of these parts in plan, and

Fig. 3 is a section illustrating propeller shaft controlled means forming part of the automatic selecting mechanism.

Figure 1:
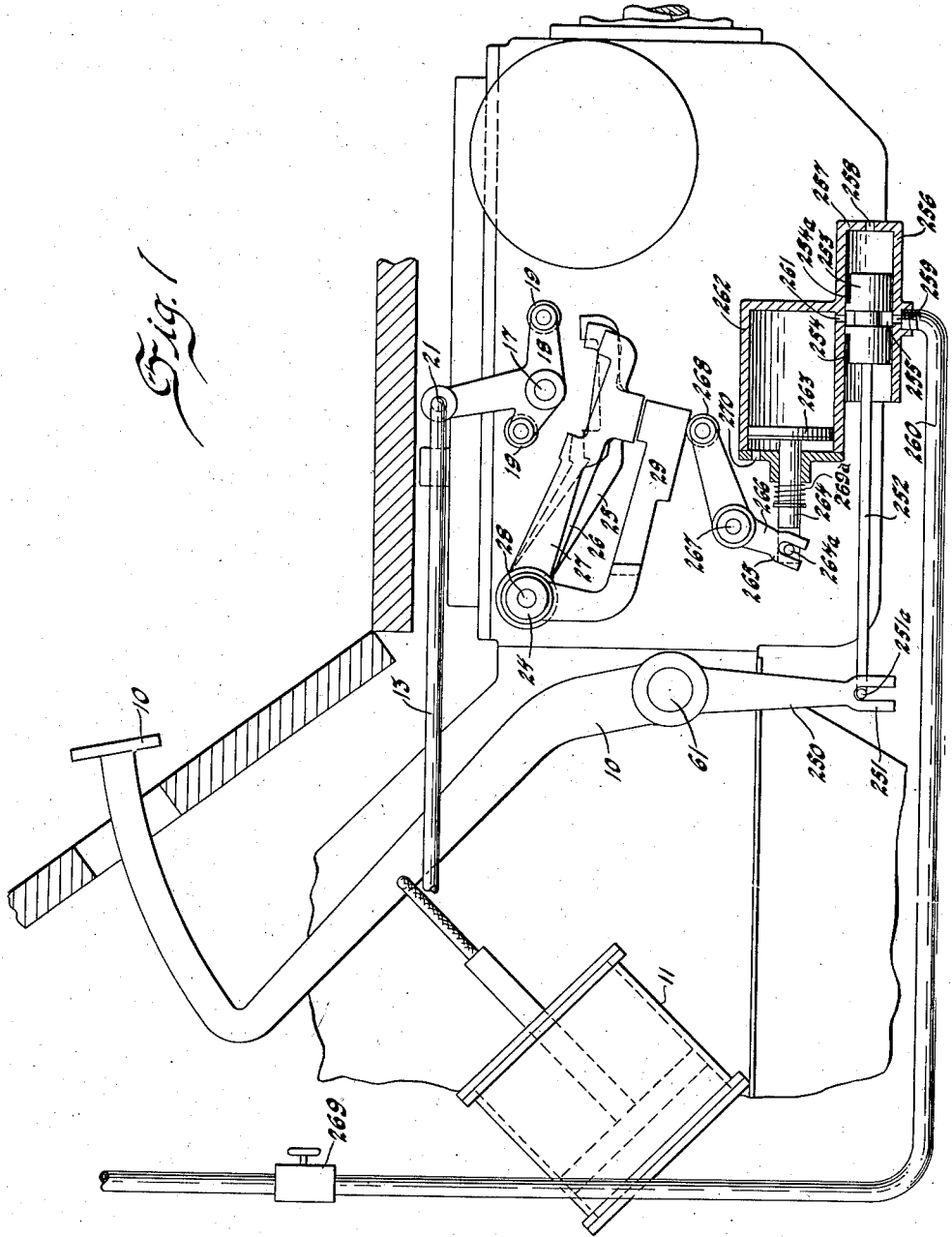

It is contemplated that an automobile equipped with the selecting and shifting mechanism here disclosed will have an engine shaft connected to a drive shaft by a clutch, the drive shaft being connected to a propeller shaft by a torque change transmission. The transmission has not been shown in detail because it forms no novel part of this invention and is already known to the art. It will be understood, however, that a slidable rail, shown on the drawings at 12, controls the act of shifting gears or in other words, the change of gear ratios. For an understanding of the present invention, therefore, it will be assumed that the rail 12 is movable to three different positions, and each of the three positions of the rail 12 represents a different gear ratio, and that the means to be described hereinafter for shifting the rail 12 to the three different positions, changes the transmission gear ratios in so doing.

The transmission parts may be selected and shifted, non-automatically and in conventional fashion by a shifting rod 13, actuated in turn by a shifting lever, not shown. The shifting rod 13, which is outside the transmission casing 14, is connected to the shifting rail 12 inside the casing by a gear sector 15, having teeth meshing with rack teeth on the shifting rail. The gear sector inside the casing is mounted on a stub shaft 17 projecting therefrom and a rocker arm 18 is fixed upon the stub shaft externally of the transmission casing. The shifting rod 13 is connected to the upper end of the rocker arm 18 at the connection 21 and it will be seen that the shifting rail 12 may be moved by the rod 13 through the rocker arm 18, stud-shaft 17 and gear sector 15 to any of the three positions representing different gear ratios. It will also be seen, from that which follows, that the shifting rail 12 may be moved to any of the three above mentioned positions by means which engages rollers 19 on the ends of the rocker arm 18 to move the stub shaft 17 and the gear sector 15 rotatively, thereby causing such movement of the shifting rail.

Spaced from the stub shaft 17 and also projecting from the transmission casing is a tubular shaft 24 which serves as an axle for a plurality of shifting arms 25, 26 and 27. These arms correspond in number to the number of forwardly driving selection parts in the transmission, there being three only shown in the particular embodiment here illustrated, although it will be understood that any other number might well be used in connection with a transmission having more than three forward speeds. As may be seen in Fig. 1, the ends of the arms are formed with angular yokes which are adapted to engage the rollers 19 on the ends of the rocker arm 18 to rock the latter and thereby move the shifting rail. The angular yokes on the arms 25, 26, and 27 are each different from the others, whereby upon actuation thereof they each move the rocker arm 18 to a different position. The angular relationship of the yokes is such that actuation of each of the arms 25, 26 and 27, and the rocker arm 18 thereby shifts the shifting rail to positions corresponding to the three gear ratios, above mentioned. It will be seen, upon reference to Fig. 2, that the rocker arm 18 is wide enough to encompass all three yokes on the ends of the shifting arms, although only one of these shifting arms is brought into engagement with the rocker arm at any one time.

Projecting through the tubular shaft 24 and supported in the transmission casing thereby, as shown more clearly in Fig. 2, is a second shaft 28, which is slidable on its own axis. On the end of the shaft 24 which is adjacent to the arms 25, 26 and 27 is journaled a selector and shifter lever 29, the latter being L-shaped when viewed in elevation and ogee shape when viewed in plan. The selector and shifter lever when in its lowermost position rests upon a fixed stud 30 and its outer end may be brought into engagement with any one of the undersides of the shifting arms 25, 26 and 27 by swinging the same about the axis of the shaft 28.

The selector and shifter lever 29 is movable in two directions, and movement in these two directions performs different functions. The lever 29 along with the shaft 28 may be moved horizontally by means operatively connected to the propeller shaft, to positions under one or another of the shifting arms, the amount of horizontal movement and therefore its position with respect to these arms being automatically determined and controlled by the speed of the propeller shaft in a manner to be described. The lever 29 may be moved upwardly non-automatically, by personally controlled means to cause one or another of the shifting arms to engage the rocker arm and thereby to move the shifting rail 12. The horizontal movement of the lever 29 controls the selection, that is to say, it will determine which of the shifting arms will be moved and which of the elements of the transmission will be selected. The vertical movement of the lever 29 controls the act of shifting, that is to say, when moved upwardly the lever 29 will cause the pre-selected shift to be made.

The means for selecting, or in other words, for moving selector 29 horizontally and positioning it under one or another of the shifting arms and for co-relating such selections with the speed of the propeller shaft so as to form an automatic selecting mechanism, includes the elongated shaft 28 upon which the lever 29 is supported. This shaft is slidable in the transmission casing to a limited extent and has rack teeth 36 at its end which is opposite to the end upon which the lever 29 is mounted. The rack teeth 36 mesh with a pinion gear 37 on the end of a control shaft 38, the latter having a second pinion 39 meshing with rack teeth formed on a slidable sleeve 40, the latter being connected to the end of a control actuator shaft 41 whose axial sliding movement is determined by the speed of a propeller shaft 42.

The propeller shaft is provided with a gear 43 meshing with a pinion 44 fixed to a non-slidable sleeve 45 journalling and rotating on the shaft 41. To one end of the sleeve 45 are pivotally connected the weighted arms 46 of a centrifugal governor, these arms in turn being pivotally connected at 47 to links 48 which in turn are pivotally connected at 49 to a collar 50 rotatable on the shaft 41, the collar being restrained against sliding movement by fixed collars 51 on the shaft 41. A spring 52 tends to move the shaft 41 to the left as shown in Fig. 3, counteracting that influence of the arms 46 which upon rotation thereof tends to move the shaft 41 to the right as viewed in Fig. 3.

As the propeller shaft rotates it causes rotation of the weighted arms 46 and the position assumed by these arms varies with the speed of the propeller shaft. As the governor arms move away from the shaft 41 they cause the latter to slide in its bearings until the compression springs 55 telescoped between the shaft 41 and the sleeve 40 is compressed sufficiently to permit the washers 56 to engage shoulders within the sleeves 40, whereupon the sleeve will move with the shaft 41, against the restraining influence of the spring pressed check plunger 57, adapted to seat in one or another of the spaced notches 58 of the sleeve.

This construction is provided so that the sleeve 40 will not move gradually in response to slight variations in speed of the propeller shaft 42, but will move with a snap action distances equal to the spacing of the notches 58. The movement of the sleeve 40 acting through the control shaft 38 and shaft 28 will cause snap movement of the lever 29 to positions under the shifting arms 25, 26 and 27. The restraining plunger 57 and the notches 58 are spaced to correspond to the spacing of the shifting arms and ensure the lever 29 being moved into complete alinement with one or another of the shifting arms, and not under two of them at one time.

The parts described immediately above constitute means for automatically determining selection and automatically co-relating selection to the speed of the propeller shaft. Other parts constitute means for actuating the shifting part or rail and for non-automatically shifting automatically preselected elements in the transmission. The non-automatic means which forms the novel part of this invention as distinguished from the disclosure in Patent No. 2,051,113, will not be described.

The clutch pedal 10, which is mounted on shaft 61, is shown as having an extension 250 provided with a fork 251 engaging the bent end 251a of a valve rod 252, the latter, at its other end having a plunger valve 253, provided with reliefs 254, 254a and an annular groove 255. The plunger is slidable in a valve cylinder 256, open walled at one end and open to atmosphere at the other end 257 through a port 258. The cylinder, further has a port 259, connected by a conduit 260 to the suction-producing intake manifold of the engine, and also a port 261 opening into a second cylinder 262. The latter has a piston 263 whose rod 264 is connected by a pin 264a to the forked end 265 of a bell crank 266, the latter being pivoted at 267 to the transmission casing, and having a roller end 268 corresponding to the roller end 68 of the bell crank 67 of Patent No. 2,051,113.

The conduit 260 has a manually operable shut off cock 269 mounted so as to be readily accessible to the operator of the vehicle. When the cock is shut off, the suction operated means is inoperable and shifting of the parts in the transmission cannot be accomplished through movement of the clutch pedal 10.

When the cock 269 is open, however, and the clutch is engaged, as in vehicle running condition, the fork 251 will be at its extreme left position, as will be valve 253. The cylinder 262 will have been vented through port 261, relief 254a, and port 258, and the piston 263 will be at the left, being thus biased by the spring 269a on piston rod 264. The selector 29 will be down, at that time.

When a not previously existant driving relation is to be established in the transmission, the clutch pedal will be moved in, to clutch disengaged portion, by the operator, acting through a clutch actuator (11), or directly on the pedal 10. The initial movement of the pedal towards clutch disengaged position (as shown) will move valve 253 to the right, first closing off port 261 to atmosphere, to stop the venting of cylinder 262, and then opening the port 261 to suction through groove 255, port 259, and conduit 260, permitting atmospheric pressure, at port 270 to move piston 263 to the right, (from the position shown) whereupon selector or shifter member 29 will be moved upwardly to create a driving relation corresponding to the shifter arm under which the member 29 is then positioned.

Continued movement of the clutch pedal towards disengaged position causes valve 253 to move further to the right, cutting off suction at 259, and venting cylinder 262 through port 261, relief 254, and the open end of cylinder 256, whereupon piston 263 is moved back to the left, by the spring 269a, thus permitting selector 29 to drop.

If during the upward movement of selector 29 on clutch disengagement, there happens to be effected a shift which is satisfactory for the vehicle speed at the moment of clutch reengagement, then return movement of the latter, for clutch reengagement, merely causes the selector or shifter member 29 to go through the motions of torque changing, without repeating the operation. If, however, as will sometimes be the case, the selector 29 fails to effect a shift that is proper for that speed of the vehicle existing when the clutch is reengaged, then movement of clutch pedal 10 for clutch reengagement will cause valve 253 to move to the left, lifting selector 29 once more, then to effect the proper shift.

Because member 29 is caused to rise for shifting on the clutch disengaging stroke of pedal 10 as well as on the clutch engaging stroke thereof, shifting will sometimes be effected, even before the clutch pedal has completed its full cycle of movement. In any event shifting movement of member 29 positively occurs on the return stroke of the pedal, in some instances to accomplish the change and in other instances to check a momentarily earlier change.

Now having described the invention, together with a preferred embodiment thereof, it will be understood that the scope of the same will be determined, not by the foregoing detailed description, but by the claims which follow.

What I claim is:—

1. The combination with a motor vehicle provided with a control pedal and a shaft for controlling a change speed transmission whose rotative positioning defines different speed drives in the transmission, a plurality of members associated with said shaft and adapted to rotate said shaft to different positions, selecting means adapted to be positioned adjacent any one of said shaft rotating members, and means actuated by movement of said control pedal for causing engagement of said selecting means with one of said shaft rotating members during initial movement of said control pedal, said means being rendered inactive by continued movement of said control pedal to disengage said selecting means to permit movement thereof to different selecting positions.

2. The combination with a motor vehicle provided with a control pedal and a shaft for controlling a change speed transmission whose rotative positioning defines different speed drives therein, a plurality of members associated with said shaft and adapted to rotate said shaft to different positions, selecting means adapted to be positioned adjacent ony one of said shaft rotating members, and means actuated by movement of said control member in either direction for causing engagement of said selecting means with one of said shaft rotating members.

3. The combination with a motor vehicle provided with a control pedal and a shaft for controlling a change speed transmission whose rotative positioning defines different speed drives therein, a plurality of members associated with said shaft and adapted to rotate said shaft to different positions, selecting means adapted to be positioned adjacent any one of said shaft rotating members, and fluid pressure means actuated by movement of said control pedal both up and down to cause engagement of said selecting means with one of said shaft rotating members.

4. The combination with a motor vehicle provided with a control pedal and a shaft for controlling a change speed transmission whose rotative positioning defines different speed drives therein, of a plurality of rocker arms mounted on said shaft, a selecting member slidably mounted to be positioned adjacent any of said rocker arms, and means actuated by movement of said control pedal in either direction for moving said selector pivotally and into engagement with one of said rocker arms.

5. Control means for a change speed transmission of the type having different speed ratios comprising a control pedal, a shifter mechanism adapted to be operated to cause the act of shifting in the transmission, a selecting mechanism adapted to be operated to select the different speed ratios rendered operative by said shifting mechanism and to operate said shifter mechanism, fluid pressure means for moving said selecting mechanism to actuate said shifter mechanism, and a double acting valve controlling said fluid pressure means and operated by said control pedal, said valve being adapted to cause successive actuations of said fluid pressure means with disengagement and engagement movements of said control pedal.

6. Control means for a change speed transmission of the type having different speed ratios comprising a control pedal, a shifter mechanism adapted to be operated to cause the act of shifting in the transmission, a selecting mechanism adapted to be operated to select the different speed ratios rendered operative by said shifting mechanism and to operate said shifter mechanism, fluid pressure means for moving said selecting mechanism to actuate said shifter mechanism, a valve controlling said fluid pressure means, and connection between said control pedal whereby up and down movement thereof causes successive operations of said valve and successive operations of said fluid pressure means.

7. In a selector and shifter mechanism for a transmission of a motor vehicle, a control pedal, fluid pressure means for actuating said selector and shifter mechanism, a valve connected to said fluid pressure means, a pipe line adapted to be connected to a source of vacuum said valve being interposed between said fluid pressure means and said pipe line, said valve being also adapted to connect said fluid pressure means with the atmosphere, means operatively connecting said control pedal with said valve including means for connecting said fluid pressure means with said pipe line during initial movement of said pedal from a normal position, means for connecting said fluid pressure means with the atmosphere during continued movement of said pedal, and means for connecting said fluid pressure means with said pipe line during return movement of said clutch pedal.

TRACY BROOKS TYLER.